US012755269B2

(12) United States Patent
Dehghanpour et al.

(10) Patent No.: US 12,755,269 B2
(45) Date of Patent: Oct. 6, 2026

(54) ON-DEVICE ACCESSIBILITY OPTIONS FOR CHECKOUT DATA USING SHORT-RANGE WIRELESS TRANSMISSIONS

(71) Applicant: PAYPAL, INC., San Jose, CA (US)

(72) Inventors: Ali Dehghanpour, Kungsängen (SE); Ida Ristner, Vallentuna (SE); Samer Mlattialy, Stockholm (SE); Paul Robert Etienne Ostonen Peelen, Ingarö (SE); Eduardo Alejandro Solana Lopez, Danderyd (SE); Savvas Viktor Grammatikopoulos Rosendahl, Järfälla (SE); Svadangs Karin Marit Alden, Hägersten (SE)

(73) Assignee: PAYPAL, INC., San Jose, CA (US)

( * ) Notice: Subject to any disclaimer, the term of this patent is extended or adjusted under 35 U.S.C. 154(b) by 42 days.

(21) Appl. No.: 18/743,808

(22) Filed: Jun. 14, 2024

(65) Prior Publication Data

US 2025/0384421 A1 Dec. 18, 2025

(51) Int. Cl.
*G06Q 20/32* (2012.01)
*G06F 16/955* (2019.01)

(52) U.S. Cl.
CPC ....... *G06Q 20/3278* (2013.01); *G06F 16/955* (2019.01); *G06Q 20/3276* (2013.01)

(58) Field of Classification Search
CPC ............ G06Q 20/3278; G06Q 20/3276; G06F 16/955
See application file for complete search history.

(56) References Cited

U.S. PATENT DOCUMENTS 8,768,765 B1 * 7/2014 Kato .................. G06Q 30/0242 705/14.4
2010/0320266 A1 12/2010 White
2013/0311313 A1 11/2013 Laracey
2017/0193490 A1 * 7/2017 Mercille .............. G06Q 20/322
2019/0303938 A1 * 10/2019 Sanchez-Llorens ......................... G06Q 20/405
2022/0358484 A1 11/2022 Brudnicki et al.

FOREIGN PATENT DOCUMENTS

WO WO-2013040684 A1 * 3/2013 ........... G06Q 20/382

OTHER PUBLICATIONS

International Search Report and Written Opinion for Application No. PCT/US2025/030862 mailed on Jul. 29, 2025, 9 pages.

* cited by examiner

*Primary Examiner* — A. Hunter Wilder
(74) *Attorney, Agent, or Firm* — Haynes and Boone, LLP

(57) ABSTRACT

There are provided systems and methods for on-device accessibility options for checkout data using short-range wireless transmissions without needing a user or device identifier. A user may engage in a transaction with another user, such as a purchase of goods, services, or other items from a merchant at a physical merchant location. The merchant may provide options to receive checkout data on a mobile device so that the checkout data may be presented with accessibility options that assist a user in consuming the data. The checkout data may be transmitted via data exchanges using short-range wireless communications. A message may be generated that includes a webpage address or another identifier allowing for retrieval of a webpage or user interface data for the checkout data. The checkout data may also be updated by the user on the mobile device, which may be provided to the merchant device.

20 Claims, 6 Drawing Sheets

ON-DEVICE ACCESSIBILITY OPTIONS FOR CHECKOUT DATA USING SHORT-RANGE WIRELESS TRANSMISSIONS

TECHNICAL FIELD

The present application generally relates to anonymity-enabled data transmission and more particularly to providing accessibility options and data on mobile devices without requiring users to provide identifiers and identification information to merchant devices during checkout.

BACKGROUND

Users may utilize online transaction processors for processing payments between different entities through device applications and digital accounts. Further, these online transaction processors may also provide payment options for in-person transaction processing and use at merchant locations. In this regard, merchants may utilize in-person payment terminals, such as point-of-sale (POS) devices that may include components and modules for local wireless exchanges of data and transaction processing. Merchants may implement payment services and processing functionalities from transaction processors through these POS devices and/or other payment terminals. Users may then pay utilizing payment instruments and/or funds, such as cash, credit or debit cards, mobile applications and digital wallets, and the like.

Some users may require or desire accessibility options and assistance, such as users that may have disabilities or be impaired. Conventionally, merchants may provide assistance through their computing devices and/or employees. However, this may not be preferrable to certain users and/or based on certain disabilities or impairments. Further, some users may encounter difficulties requesting assistance or may not want to engage with merchants when their disabilities or impairments may draw attention to those nearby the user. As such, conventional ways provide inadequate accessibility options in many cases. Other processes to provide data to users during merchant interactions require the user to enter a contact identifier or other user and/or contact information, such as an email address or phone number for text messages. This reveals personal and private information to the merchant and/or other services providers engaged in this process, which may not be desirable for a user who wishes to protect their privacy. Due to unwanted communications and advertisements, dissemination of personal data, cyberattacks, phishing schemes, and malware that may compromise the user's account, transaction processors may desire to enforce further privacy protections, which may be required by law, regulations, and/or company policies. Thus, it is desirable for merchants to provide accessibility options directly on devices of users in a privacy protected and/or anonymous manner quickly and efficiently with minimal interference from other devices and users.

Figure 1:
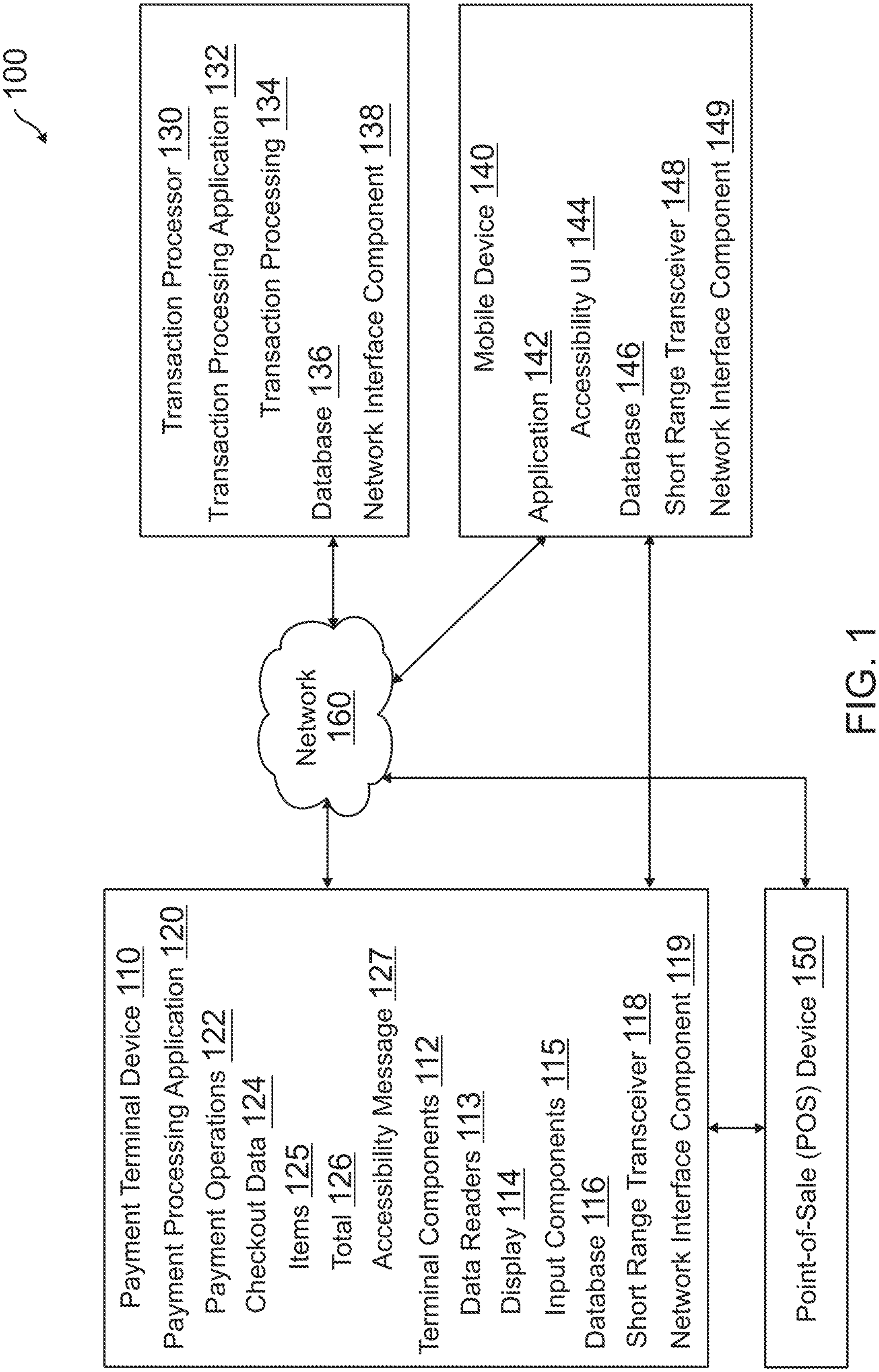
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for on-device accessibility options for checkout data using short-range wireless transmissions. Systems suitable for practicing methods of the present disclosure are also provided.

A user may utilize a digital account, payment card, and/or other funding source to process payments through an electronic payment and/or transaction network associated with a backend payment processor or other entity on the network. An identifier may be linked to a digital account of the user with an online transaction processor, such as a payment service provider (e.g., PAYPAL®) which may provide electronic transaction processing services to users through the account and one or more, real-world physical locations, websites, and/or applications of the online transaction processor or a merchant. The online transaction processor may include an integration with the electronic payment network (e.g., for payment cards, tokens, and the like) that allows for data exchange and communications between the two networks, such as to process transactions (e.g., approve or decline, and well as request monetary payments, transfers, conversions, etc.) and issue receipts or other transaction histories. Further, this payment network may provide data communications and backend processing devices that provide for interaction with frontend merchant, POS, and/or payment terminal processing devices that process transactions.

In some embodiments, frontend merchant devices may include POS devices and/or payment terminals processing payments using cash, check, and/or payment cards through near field communications (NFC), radio frequency identification (RFID) fields and communications, Bluetooth or WiFi communications, infrared scanners and/or communications, EMV chip readers, magnetic stripes and/or emulation readers, and other in-person and/or local data transfers. However, conventionally to utilize such payment mechanisms and/or exchange data outside of a short RFID transmission, user must share contact identifiers and/or other personal data so that the POS devices and/or payment terminals may communicate back with the user's mobile device or other computing device. This may not be desirable by some users and/or in certain circumstances, such as when users may be concerned with sharing PII, receiving unwanted advertisement, or the like. Merchants may also not want to receive and store PII due to regulatory requirements and/or concerns for data breaches.

Further, users at a physical merchant location may need or desire assistance with processing transactions at the location. For example, a user may feel uncomfortable talking or unable to talk with a store employee (e.g., due to hearing or speaking impairments, loud location, etc.) and/or unable to approach a store employee for a variety of reasons (e.g., language issues, lack of available employee, visual impairments, crowded location, etc.). Conventionally, accessibility options are provided directly by merchants, merchant employees, and/or merchant devices. One type of accessibility option or assistance is providing audio playbacks and/or display of data in different manners (e.g., size, language, etc.). However, these methods are obtrusive and require users to utilize the limited options of the merchant. Further, the options are not discreet and do not provide safety, flexibility, and comfort of use to many users who may require accessibility options.

While merchants may contact users directly on their mobile devices to provide data, such as transaction information for the user to review, this requires that a user enter their contact information (e.g., name, email address, phone number, etc.). For example, text messages and emails may be transmitted by SMS/MMS or sent via email. However, input of contact identifiers and other contact data reveals private or personal information for the user, or otherwise compromises the user's anonymity, so that the merchant or other service providers may contact the user. Many merchants may disguise such processes as enrolling in reward systems, which may be undesirable by certain users and may create unnecessary and unwanted accounts or user data. As such, both users and merchants may be concerned with privacy and privacy protection laws or regulations, big data mining and advertisements or other outreach, and the like.

Thus, an online transaction processor, as discussed herein, may provide operations that allow for faster and more convenient accessibility options directly on user's mobile devices using contactless or nearby data exchanges that do not require exchange of user or contact identifiers. During checkout, a payment terminal device or other computing system may provide users with an option to "tap" to obtain data that allows output through or using one or more accessibility options or features on the user's mobile, wearable, or other computing device, thereby turning the user's device to an accessibility device. A tap may generally refer to an NFC or RFID "tap" or wireless data exchange that wirelessly communicates data over a short-range (e.g., 4-5 centimeters (cm) or less for NFC taps, which allows sharing of a small data payload between NFC devices and/or readers, however other distances are contemplated). A transaction may be generated when items are added, and the user may wish to view the transaction details during transaction generation, checkout, payment, and the like. For example, the user may have a disability or impairment (whether permanent, temporary, or situational, as well as physical or mental), which may require or be alleviated using accessibility options.

In this regard, when a transaction is generated and/or an option for on-device accessibility options and features is requested, the merchant device, payment terminal device, and/or transaction processor may create a digital file associated with a particular webpage and/or webpage address for transaction information, checkout, and/or payment. This may also or instead correspond to application data for a user interface of an application. When requesting the transaction data for accessibility use and/or output, the user's mobile device may receive a message or other data through short-range wireless communications, such as an NFC tap, and the user is not required to enter contact or personal data, such as a contact identifier. The user's device may then load the webpage or application interface and proceed with an accessibility option, feature, and/or output. Thus, the accessibility data may be provided without the user providing the merchant with contact identifiers, personal information, and the like.

In this regard, a webpage address (e.g., a uniform resource locator (URL), uniform resource identifier (URI), or other file path and/or resource locator usable to identify data over a network) for the webpage or application interface including transaction data and/or accessibility data for the transaction may then be broadcasted using an NFC standard. This standard may be utilized for a message having message embedding that causes a browser application on a mobile device to open and execute the browser application and navigate to the webpage. The file and/or data for accessibility output of the transaction, checkout, and/or payment may then be loaded to the webpage, downloaded, or otherwise accessed and obtained via the webpage and address, which may occur without the user entering contact identifiers or other user contact information. Further, by utilizing short-range wireless communications (e.g., NFC communications limited to 4-5 cm of distance), sharing or theft of the transaction, checkout, and/or payment data may be minimized as any device being placed in such a proximity during data transmission would be able to be seen by the merchant, user, or another.

In a typical scenario, a user may desire to purchase items at a real-world physical merchant location, such as a merchant storefront, retail location, or the like that provides in-person transaction processing through POS devices, payment terminals, and other merchant devices and systems. Selection of one or more items in an in-person transaction at a physical merchant location may require a payment instrument from the user for electronic transaction processing, which may be provided through a cash or other physical fiat currency, a payment card and embedded or encoded data (e.g., magnetic stripe, EMV chip, NFC chip, etc.), token, identifier, data package, or the like that is transmitted to a merchant device at the location. Payment may be made via short-range wireless communications (e.g., contactless payments via NFC, RFID, etc.) using a digital wallet with an online service provider or other transaction processor. A digital account with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may also be required to provide financial information, including digital account (e.g., credit/debit card) information, bank account information, gift card information, benefits/incentives, and/or financial investments, when processing transactions with merchants and/or other users or entities. Account creation may also be used to establish account funds and/or values, such as by transferring money into the account and/or establishing a credit limit and corresponding credit value that is available to the account and/or card. The service provider may provide computing services to send, store, and receive money, process financial instruments, and/or provide transaction histories. The service provider may also provide for tokenization of data for transaction processing. The application or website of the service provider, such as PayPal® or other online payment provider, may provide payments and the other transaction processing services. Moreover, the digital account may be utilized through one or more mobile applications for mobile devices or other software applications.

In order to pay for the transaction using the account (e.g., a transfer or payment to another user, merchant, or other entity), the user may provide the digital account or funding source information and/or may login to an account with the service provider through authentication information in a software application. When providing in-person payments through payment terminals and a mobile device, a digital wallet may be utilized with the account to provide data to the terminal or device wirelessly. In this regard, an identifier and/or digital token or other data may authorize and/or authenticate the user for their digital wallet use and/or a payment instrument in the digital wallet (e.g., the account with the online transaction processor), which may be transmitted to another party for payment processing via wireless communications. This token, identifier, or other payment data may be anonymized, limited use, and/or include obscured or hidden payment or financial data, PII, or the like, which may prevent revealing a user's identity and/or information. The data for transaction and payment processing may be stored by and/or transferred using one or more storage mediums and/or wireless transceivers, such as an NFC/RFID component, fob, passive or active antenna, etc., a magnetic stripe or an EMV chip, a displayable code or data, or the like. A payment may then be issued to the other party to the transaction. Thereafter, a receipt or other transaction history may be optionally provided, or required to be offered/provided, to the user to document and record the transaction processing (including approval and payment or refusal and reason for refusal).

During transaction generation, processing, checkout, and/or payment (e.g., when a transaction is start, as items are added, when a total is calculated and payment requested, and/or during payment processing and receipt generation), a POS or payment terminal device of a merchant, or other merchant system and/or component, may prompt the user to determine whether the user would like to receive data associated with the transaction via a mobile device that may provide accessibility options and/or features for output of the transaction data. For example, a mobile device may provide for audio output via a speaker or headphones in a manner for hearing or sight impaired, may provide visual outputs for visual or mental impairments, may provide haptic feedback, or may otherwise assist users with disabilities and/or impairments. In this regard, the user may want to view, hear, or otherwise consume information for the transaction in real-time as the transaction is generated and/or processed, while checkout is performed, and/or when payment is requested and/or processed.

As such, when a transaction is being processed, the merchant's POS or payment terminal device may provide a "tap for accessibility" option, whereby the user's device may be turned into an accessibility-enabled device for purposes of providing accessibility features or options for checkout data output. In this regard, accessibility may correspond to inclusive options and features that seek to reduce barriers and obstacles from users with disabilities, restrictions, impairments, or other desired assistance, even with users without impairments due to environment/store issues. The user may select between options and/or have a preselection made (e.g., by the user, such as based on the user's past history, used payment instrument, loyalty account and/or preferences, or by the merchant). If the user selects the accessibility option for the user's device, such as the tap option for wireless NFC, FRID, or other short-range wireless protocol transmission, the payment terminal may then initiate a process to wirelessly broadcast and/or transmit data necessary to receive a message linking to transaction and/or accessibility data via short-range wireless communications. Further, the device or system may not ask, request, or require user contact information and/or identifiers when communicating with the merchant's device wirelessly at the merchant location and within a proximity range between the user's mobile device and the merchant's POS device, payment terminal, or other merchant system. Thus, the process may proceed independently from requesting and receiving such personal and/or contact data.

A display device, component, or other output component may begin displaying instructions to wireless connect and/or communicate with the merchant's device to receive accessibility related data on the user's device, such as an instruction to "tap" the user's mobile or wearable device (e.g., mobile smart phone, smart watch, etc.) to a particular component or area of the POS device, payment terminal, or the like. The "tap" area may be indicated by the display device and/or by markings or configuration of the merchant's device and/or checkout infrastructure, and may include the short-range wireless transmitter, antenna, or transceiver, which may provide for broadcasting of data wirelessly to nearby devices. The payment terminal may also display an indicator, message, or other information that indicates when and for how long the data is being broadcast, such as a "Tap Now!" or "Sending!" message to indicate the broadcasting is occurring.

In order to perform the broadcast of data that may send and/or populate the webpage or application interface for the transaction on the user's device, thereby enabling on-device accessibility options, the payment provider, transaction processor, or other service provider may create data for a webpage or other pathway that hosts and/or provides the checkout data and can be updated in real-time as the transaction is processed and changed (e.g., items are added, deleted, etc., costs are calculated and/or added (e.g., tax, shipping, etc.), and/or payment is requested). The created data for the transaction may correspond to a webpage address, a file path, and/or a data file, such as an extensible markup language (XML) or hypertext markup language (HTML) file or object that may be loaded by a webpage in a web browser application or in a software application interface (e.g., interface of a mobile application on a mobile device) in response to receiving the data, a navigation to, and/or opening of a webpage address, link, or data file. In this regard, a transaction processor and/or online webpage indexing and hosting systems may be utilized to generate the corresponding file and/or webpage.

The webpage or file may include information for the transaction and checkout, such as items or services, merchant location and/or merchant information, prices and costs, date and time, tax or other fees, tip or other additional gratuities and expenses, and the like. Further, the data may be dynamic and/or updateable in one or more portions, fields, webpage/interface elements, or the like on the webpage or in the interface so that real-time changes may be made as the transaction is processed, such as when items are added, removed, or changed in the transaction. This dynamic and/or updateable data may be updated and changed as the merchant's device communicates with the service provider's backend to provide transaction details as they are entered and processed. The transaction processor may further change, convert, or enable accessibility options and features, or such changes to output the data based on accessibility options may be done at the user's mobile device later on receipt of the webpage or interface data. The data file and/or webpage may then be stored, cataloged, and/or persisted to make available via the corresponding address, link, file path, or the like. The service provider's backend may be used as a centralized system and/or repository that allows for sharing and consuming checkout data output based on accessibility option.

To share the data with the user's mobile device, different communication pathways and channels may be utilized. For example, in a first scenario that does not require the user's mobile device or the like to share data back with the merchant's POS, payment terminal, or other device/system, the service provider may generate a message or other data for broadcast via the short-range wireless communications utilized by the POS or payment terminal device, or another merchant system/component. The message may be generated to include the webpage address in the message or other link, address, file path, or the like for webpages and/or application data (e.g., for display via application interfaces). In this regard, the message may have a field, portion, or the like that includes the webpage address, link, or patch, such as having the address embedded in a message header, body, etc. The message may automatically cause a computing device receiving the message to open or execute a web browser application or dedicated software application and navigate to the webpage or populate an interface that includes the checkout data, as well as any accessibility options or features that the webpage or application may provide or enable. The accessibility options may be provided via the transaction processor, the mobile device, and/or the application presenting the checkout data.

The message may cause applications to open and/or load the webpage or data accessible at the link or file path in one or more interfaces. Such opening and/or loading may be done automatically or after accepting an interface prompt and request based on the computing device receiving the message. For example, a mobile device may be configured with NFC protocols and operations to receive NFC messages having web addresses embedded in a particular portion, which causes the mobile device to load and navigate to such address in a web browser application. This would then cause the webpage file to be loaded such that the user's device may receive the checkout data and any updates, as well as output the checkout data based on any accessibility options including visual appearances and/or changes to visual outputs, audio outputs, haptic feedback, language, or the like. If a failure to exchange data occurs, the merchant and/or user may select an option for other transmission of the data via a displayable code on a display component of the merchant's device, such as a Quick Response (QR) code, which may be captured by the user's device using a camera, code scanner, or the like.

In a second scenario, when paying for the transaction, the user's mobile device may provide a payment via a digital wallet and stored payment instrument, accessible value, cryptocurrency, and/or token. The user's mobile device may be used for a "tap-to-pay" type feature where a payment may be made through NFC data exchange. This tap may occur at checkout and payment, but may also occur earlier in the transaction for the user to receive the checkout data output based on accessibility options prior to payment. The user's digital wallet may authorize transmission of, or the user may consent to the wallet sharing, a loyalty identifier or other information that may be used by the service provider to identify the user and therefore the user's device. The service provider, after generating the webpage and/or application interface data, as described above, may then share, push, transmit, or otherwise provide the data to the user's device directly over a network connection, such as a cellular data network. This may occur without relaying the data through the merchant's device, which therefore does not require the user's device to be tapped again to the merchant's device. Further, the loyalty data may be tokenized, encrypted, or otherwise secured from being revealed (e.g., in plaintext) to the merchant's device for additional privacy or security. As such, the service provider's backend and user's device may communicate to exchange the checkout data for accessibility outputs. Other scenarios may also be used for exchange of an identifier to have the service provider's backend push or provide data to the user's device, as well as processes to share data without identifier exchange between the user's device and the merchant device (e.g., WiFi, Bluetooth, etc.).

When the user's mobile device receives the message, the webpage or application interface may appear, and accessibility options may be provided. In some embodiments, the accessibility options may immediately be selected and/or initiated, such as to begin output of the checkout data and other information for the transaction or payment based on the accessibility options (e.g., to provide an accessibility feature for sound, visual, haptic, or other output). However, accessibility options may also require selection and may include various start, stop, and playback features. The checkout data may be updated as the checkout proceeds and new items are added, deleted, or changed with regard to the transaction. For example, the webpage may be updated as the payment terminal device and/or merchant device updates and changes the transaction, or the application data may be updated or changed in a similar manner. This may allow the user to follow the transaction on their mobile device and based on their desired accessibility options.

Further, the data may be interactable by the user. For example, the user may select items/services in a transaction to view their details, information, cost, etc., may decline certain items/services or ask for removal, may inquire about items/services or be asked to view/review items/services and/or their costs/information, may request new or different items/services, and the like. As such, updates may also be sent via the webpage or application back to the transaction processor and/or merchant device/payment terminal device over a network connection based on input to and communication from the user's mobile device. After the user's mobile or other computing device receives the data, the user may also elect to pay for the transaction via their mobile device and using their selected accessibility option(s), which allows for on-device payments over a network, as well as via tap-to-pay NFC or other short-range communications. In this manner, pager accessibility options for transaction and checkout data may be provided on users' mobile devices in a safe, anonymous, and convenient manner and without requiring users to enter contact and/or personal data, thereby increasing online and digital user privacy protection. This allows merchant systems to be more regulatory compliant and provide customer-focused processes for privacy protection. Further, the operations provide faster and more efficient data exchange for checkout data that may be presented with or based on accessibility options. Therefore, a merchant system may provide coordinated communications and data processing for accessibility checkouts in faster, more secure, and more efficient manner.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a payment terminal device 110, a transaction processor 130, a mobile device 140, and a POS device 150 in communication over a network 160. Payment terminal device 110 and/or mobile device 140 may be used to establish a transaction and process a payment for the transaction. In this regard, when the transaction is processed, the transaction data may be processed, such as between payment terminal device 110 and transaction processor 130. Payment terminal device 110 may then provide an option to provide transaction and checkout data with accessibility options on mobile device 140 without requiring the user associated with mobile device 140 to enter or provide personal information and/or contact identifiers directly to payment terminal device 110 and/or POS device 150.

Payment terminal device 110, transaction processor 130, mobile device 140, and/or POS device 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Payment terminal device 110 may be implemented using any appropriate hardware and software configured for wired and/or wireless communication with user devices, and may correspond to a single or all-in-one system for a merchant device, POS device and/or checkout register, or the like. However, in other embodiments, payment terminal device may correspond to a card reader, payment terminal, contactless payment transceiver and device, and the like that integrates locally and/or on the back end with POS device 150 or another merchant system used for processing a transaction. As such, in different embodiments, payment terminal device 110 and POS device 150 may correspond to the same device configured to provide payment processing using transaction processor 130 over network 160, or may correspond to separate devices that interact to provide such payment processing. In various embodiments, payment terminal device 110 may be implemented as a personal computer (PC), a payment terminal device with payment processing components, a smart phone, laptop/tablet computer, wristwatch with appropriate computer hardware resources, other type of wearable computing device, and/or other types of computing devices capable of transmitting and/or receiving data. Although only one device is shown, a plurality of devices may function similarly.

Payment terminal device 110 of FIG. 1 contains a payment processing application 120, terminal components 112, a database 116, a short-range transceiver 118, and a network interface component 119. Payment processing application 120 may correspond to executable processes, procedures, and/or applications with associated hardware. In other embodiments, payment terminal device 110 may include additional or different modules having specialized hardware and/or software as required.

Payment processing application 120 may correspond to one or more processes to execute software modules and associated components of payment terminal device 110 to provide features, services, and other operations for payment processing with a merchant POS device and/or over network 160 with transaction processor 130, which may include processes to provide checkout data on mobile device 140 with accessibility options. In this regard, payment processing application 120 may correspond to specialized software utilized by a user of payment terminal device 110 that may be used to access a website or application (e.g., mobile application, rich Internet application, or resident software application) that may display one or more user interfaces that allow for interaction with the computing services of transaction processor 130 for payment processing. In various embodiments, payment processing application 120 may correspond to a general browser application configured to retrieve, present, and communicate information over the Internet (e.g., utilize resources on the World Wide Web) or a private network. For example, payment processing application 120 may provide a web browser, which may send and receive information over network 160, including retrieving website information, presenting the website information to the user, and/or communicating information to the website. However, in other embodiments, payment processing application 120 may include a dedicated application of transaction processor 130, a merchant system or merchant device, or other entity.

Payment processing application 120 may include payment operations 122, which may be used to process payments with users. For example, payment operations 122 may be used to receive and/or generate a transaction to purchase one or more items or services, such as by receiving item or service input and selection through item scanning, menu or interface selections and input, receipt of a transaction or order from another device or server (e.g., generated by mobile device 140 and provided to payment terminal device 110 for processing and/or fulfillment), and the like. Payment operations 122 may further request payment for the transaction, which may be provided using cash and merchant input, a check and merchant input and/or a check reader, a payment or gift card using a card reader (e.g., magnetic stripe reader, EMV or RFID chip reader, etc.), and/or a contactless payment terminal and component for mobile application payments from mobile devices (e.g., via NFC, RFID, QR code scanning, etc.). Payment processing application 120 may process a transaction and/or a payment request using payment data from one or more contactless payment devices, terminals, transceivers, or the like, as well as merchant input (e.g., cash or check transactions).

Payment operations 122 may allow a merchant and/or user to enter, receive, and process transaction and payment data. In this regard, payment operations 122 may utilize terminal components 112, short-range transceiver 118, and/or network interface component 119 for data entry and/or communication. Thereafter, payment processing application 120 may be used to view the results of transaction processing and the like via one or more interfaces, which may include a receipt or other transaction history that may be transmitted to mobile device 140 or another endpoint/address and/or printable on a physical receipt. This may include short-range wireless transmissions of digital receipts or other receipt data independent of requiring a user to provide input for an email address, phone number, or the like for receipt data transmission.

Checkout data 124 may correspond to data that may be generated, updated, and processed during a checkout of a transaction, including transaction information for items 125, a total 126 for the items, and the like. Checkout data 124 may be provided to mobile device 140 via one or more of the processed described herein through an accessibility message 127, which allows output of checkout data 124 in accordance with one or more accessibility options and/or features on mobile device 140. In this regard, payment terminal device 110 may initially request that the user select whether to receive checkout data 124 and updates or notifications for checkout data 124 on mobile device 140 for use with accessibility options. This may be done through a "tap-to-accessibility" option, which alerts the user that checkout data 124 is available to be received on mobile device 140 so that it may be output based on accessibility options.

If the option is selected, data may be exchanged via an NFC or similar tap, or short-range wireless communications within a proximity range (e.g., bringing mobile device 140 within 4-5 cm of payment terminal device 110 and/or short-range transceiver 118 of payment terminal device 110 for NFC transmissions). Checkout data 124 may be generated, such as transaction information detailing items 125 as items are added to the transaction and total 126 as costs are calculated and updated. A webpage and/or data for an application interface may be generated by payment terminal device 110 and/or transaction processor 130, which may include real-time data output of checkout data 124 and checkout data 124 is generated, updated, and processed. The webpage or application interface data may correspond to a file, document, or data object that includes checkout data 124 and dynamic fields or updateable portions for changes to items 125, total 126, or other information as the transaction is updated and processed during the checkout. For example, an XML or HTML file may be generated by payment terminal device 110 and/or transaction processor 130, where the file may be associated with a network pathway and address (e.g., a webpage address for a webpage that loads data) accessible via a corresponding webpage address, link, loading event, file path, or the like for retrieval of the webpage and/or application interface data. The webpage address may navigate to the webpage that causes loading of the file from the corresponding pathway, such as an online or cloud storage system.

Payment terminal device 110 and/or transaction processor 130 may generate accessibility message 127 as a digital message or communication that may be broadcast via the short-range wireless communications to a device within a range or proximity of payment terminal device 110, such as mobile device 140 when mobile device 140 is tapped or placed within a certain range for NFC or similar transmissions. Payment terminal device 110 and/or transaction processor 130 may generate accessibility message 127 using a messaging protocol for the short-range wireless communications and protocol, such as an NFC transmittable message. The webpage address, file path, or other link, URI or URL, or the like may be added, embedded, or otherwise provided with accessibility message 127 so that accessibility message 127 may cause mobile device 140 to prompt for or automatically navigate to the webpage using the webpage address or load application data for an application interface, which causes loading, display, and/or output of checkout data 124 in accordance with any accessibility options for selection and/or preselected accessibility options and features that may be provided. As such, mobile device 140 may then present checkout data 124 using the selected, requested, default, or intelligently determined accessibility options and features for accessible output to and consumption by and impaired or disabled user. Consuming or consumption of data may generally refer to different manners in which a user may view, hear, feel, or otherwise receive data and how the data is conveyed to the user such that the user can understand the data, interact with the data, and/or respond to the data.

Once generated, terminal components 112 and/or short-range transceiver 118 may be used to broadcast the message over short-range wireless communications. For example, payment terminal device 110 may utilize short-range transceiver 118 to transmit the message using a short-range wireless messaging protocol and technology. While short-range wireless communications, transmission, and protocols described herein may often refer to NFC, which may be used to transmit data between devices in close proximity or short range (e.g., 4-5 cm), other wireless technologies may also be used (e.g., RFID, Bluetooth, WiFi, etc.). The message may be broadcasted for a set amount of time, until received, and/or until a stoppage of broadcasting is requested. The message may be broadcast continuously or periodically and may be limited to a certain distance or proximity when transmitting.

Payment terminal device 110 may generate and transmit notifications for order statuses in this wireless manner without utilizing contact identifiers and other personal data of users. If data transmission is unsuccessful, payment terminal device 110 may transmit the data through another means. For example, data may be embedded or encoded in a displayable code, such as a QR code, for display and scanning or capture by mobile device 140 to process and receive the notifications. After transmission, checkout data 124 may be updated to change items 125, total 126 or other checkout, transaction, and/or payment data, which may cause payment terminal device 110 to update the corresponding webpage or interface data based on changes. Such changes may then be reflected in checkout data 124 being presented on mobile device 140 with accessibility options or features enabled and being used for information output. Examples of such accessibility options for checkout data provided via short-range wireless communications without contact identifiers are further discussed with regard FIGS. 2A-4 below.

In various embodiments, payment terminal device 110 includes other applications as may be desired in particular embodiments to provide features to payment terminal device 110. For example, the other applications may include security applications for implementing client-side security features, programmatic client applications for interfacing with appropriate application programming interfaces (APIs) over network 160, or other types of applications. In various embodiments, the other applications may include financial applications, such as banking applications and the like for payment processing. The other applications may include device interface applications and other display modules that may receive input from the user and/or output information to the user. For example, the other applications may contain software programs, executable by a processor, including a graphical user interface (GUI) configured to provide an interface to the user. The other applications may use terminal components 112 of payment terminal device 110, such as a display 114 capable of displaying information to users and other output devices, including speakers.

Terminal components 112 of payment terminal device 110 may be used to provide additional functionality and assist in transaction and payment processing. In this regard, terminal components 112 may include data readers 113, which may be configured to read data from payment cards, gift cards, mobile devices, key fobs, and the like. The data read from such devices may include payment data, and therefore data readers 113 may include magnetic stripe readers, EMV chip readers, NFC card of fob device readers, and the like. Terminal components 112 further includes display 114, which may be configured to output and display data to the user and/or merchant. Display 114 may be used during transaction processing to display transaction processing input, results, and the like. This may include prompts for payment data input, receipt conveyance channel selection, and the like. While broadcasting a message via short-range wireless communications, display 114 may also be used to display when the message is being broadcast, if message transmission is successful or receipt acknowledged, and/or a remaining time or end of broadcast. Ending the broadcast may cause display 114 to provide a prompt to rebroadcast or transmit via another process, such as a QR code. In this regard, terminal components 112 further including input components 115, such as buttons, a keyboard, a mouse, a touch screen interface, and the like, which enable the aforementioned inputs and selections to be made.

Payment terminal device 110 may further include database 116 stored on a transitory and/or non-transitory memory of payment terminal device 110, which may store various applications and data and be utilized during execution of various modules of payment terminal device 110. Database 116 may include, for example, identifiers such as operating system registry entries, cookies associated with payment processing application 120 and/or the other applications, identifiers associated with hardware of payment terminal device 110, or other appropriate identifiers, such as identifiers used for payment/user/device authentication or identification, which may be communicated as identifying the merchant and/or payment terminal device 110 to transaction processor 130. Moreover, database 116 may include checkout data 124 and/or other transaction processing data, which may be used to webpage/application interface data generating and/or updating by payment terminal device 110 and/or transaction processor 130.

Payment terminal device 110 includes at least one short-range transceiver 118 adapted to communicate with mobile device 140, POS device 150, and/or other nearby devices, transceivers, and/or components through short-range wireless signaling and communications including NFC communications, RFID communications, Bluetooth, WiFi, infrared scanners and/or communicators, and the like. In various embodiments, short-range transceiver 118 may correspond to microwave, RF, infrared, Bluetooth, and NFC devices and components.

Payment terminal device 110 includes at least one network interface component 119 adapted to communicate with transaction processor 130, POS device 150, and/or other devices and servers over network 160. In various embodiments, network interface component 119 may include a WiFi component, a DSL (e.g., Digital Subscriber Line) modem, a PSTN (Public Switched Telephone Network) modem, an Ethernet device, a broadband device, a satellite device and/or various other types of wired and/or wireless network communication devices.

Transaction processor 130 may be maintained, for example, by an online service provider, which may provide processes to provide account services and process payments. In this regard, transaction processor 130 includes one or more processing applications which may be configured to interact with payment terminal device 110, mobile device 140, POS device 150 and/or another device/server to facilitate communications for transactions, payment processing, and receipt provision for merchants and users. Transaction processor 130 may be maintained by or include another type of platform or service provider, for example, a transaction processor such as PAYPAL®, Inc. of San Jose, CA, USA.

Transaction processor 130 of FIG. 1 includes a transaction processing application 132, a database 136, and a network interface component 138. Transaction processing application 132 may correspond to executable processes, procedures, and/or applications with associated hardware. In other embodiments, transaction processor 130 may include additional or different modules having specialized hardware and/or software as required.

Transaction processing application 132 may correspond to one or more processes to execute modules and associated specialized hardware of transaction processor 130 to process a transaction for item(s) with payment terminal device 110 and/or mobile device 140, which may be based on in-person, short-range wireless, and/or contactless payments, data transfers, communications, and the like. In this regard, transaction processing application 132 may correspond to specialized hardware and/or software used by users to establish accounts and/or engage with electronic transaction processing services. Accounts may each be created by providing personal and/or financial information to transaction processor 130 and selecting authentication credentials. In various embodiments, the financial information may include payment instrument information, such as account/card numbers and information. An account may be used to purchase items and/or transfer funds. The payment account may be accessed and/or used through a browser application and/or dedicated payment application. Transaction processing application 132 may process a payment and may provide a transaction history for transaction authorization, approval, or denial.

Transaction processing application 132 may correspond to a service of transaction processor 130 that may be utilized by end users, such as to perform electronic payments, transfers, and the like using one or more accounts and/or financial instruments. Transaction processing application 132 may also include or utilize different processors, engines, or models as required for an authentication, account setup and maintenance, electronic transaction processing, deposit and/or withdrawal, dispute resolution, and the like. Transaction processing application 132 may include one or more API integrations and/or interactions with payment terminal device 110 and/or payment networks in order to detect, receive, and monitor checkout data 124 including items 125 and total 126, which may be updated in real-time for changes and processed through transaction processing 134. Webpages and/or application data may be generated by payment terminal device 110 and/or transaction processing application 132, which may correspond to XML/HTML files or other data. Webpages may present checkout data 124 and update the data in real-time in one or more webpage fields, areas, elements, or the like. Alternatively, application data may be generated that is displayable by one or more user interfaces, such as the data necessary to display an application interface having checkout data 124 on mobile device 140.

As such, checkout data 124 may be presented on mobile device 140 with one or more accessibility options, which may allow for output to assist a user that may have a disability, impairment, or other concern that requires a specific data output, as discussed herein. In some embodiments, transaction processing application 132 may provide the accessibility options and/or may generate the webpage and/or application data based on accessibility options, such as to output and/or present the data based on a required visual appearance, audio output, haptic feedback, or the like. However, accessibility options and features may also be provided by mobile device 140 and checkout data 124 may be served directly via the webpage and/or application interface.

Transaction processing 134 may process a transaction provided on mobile device 140 in accordance with checkout data 124 and accessibility options, as well as provide another service to customers, merchants, and/or other end users and entities of transaction processor 130. In this regard, transaction processing 134 may provide electronic transaction processing using an account provided by transaction processor 130. Checkout may be done using accessibility options and features, which may include payment processing through voice-to-text or speech commands, specific biometric or assistance-enable payment identifiers and/or authentication, and the like. Computing services of transaction processing application 132 may also or instead correspond to messaging, social networking, media posting or sharing, microblogging, data browsing and searching, online shopping, and other services available through transaction processor 130.

In various embodiments, transaction processing application 132 may be desired in particular embodiments to provide features to transaction processor 130. For example, transaction processing application 132 may include security applications for implementing server-side security features, programmatic client applications for interfacing with appropriate application programming interfaces (APIs) over network 160, or other types of applications. Transaction processing application 132 may contain software programs, executable by a processor, including a graphical user interface (GUI), configured to provide an interface to the user when accessing transaction processor 130 via one or more of payment terminal device 110 and/or mobile device 140, where the user or other users may interact with the GUI to view and communicate information more easily. In various embodiments, transaction processing application 132 may include additional connection and/or communication applications, which may be utilized to communicate information to over network 160.

Additionally, transaction processor 130 includes and/or is able to access database 136. Database 136 may store various identifiers associated with mobile device 140. Database 136 may also store account data, including payment instruments and authentication credentials, as well as transaction processing histories and data for processed transactions. Database 136 may store received data associated with a user, such as checkout data 124 and/or other transaction information. Although database 136 is shown as residing on transaction processor 130 as a database, in other embodiments, other types of data storage and components may be used including cloud computing storage nodes, remote data stores and database systems, distributed database systems over network 160 and/or of a computing system associated with transaction processor 130, and the like.

In various embodiments, transaction processor 130 includes at least one network interface component 138 adapted to communicate with payment terminal device 110, mobile device 140, POS device 150, and/or another device/server over network 160. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Mobile device 140 may be implemented using any appropriate hardware and software configured for wired and/or wireless communication with merchant devices, payment terminals, contactless payment transceivers and devices, and/or transaction processor 130 for receiving, viewing, and/or processing transaction, checkout, and/or payment data with those payment terminals and merchant devices independent or without of providing or inputting data that may be used to contact a user or other personal data of the user. Mobile device 140 may correspond to a user that processes payments and sales through an executable software application. In various embodiments, mobile device 140 may be implemented as a personal computer (PC), a smart phone, laptop/tablet computer, wristwatch with appropriate computer hardware resources, other type of wearable computing device, and/or other types of computing devices capable of transmitting and/or receiving data. Although only one mobile device is shown, a plurality of mobile devices may function similarly.

Mobile device 140 of FIG. 1 contains an application 142, a database 146, a short-range transceiver 148, and a network interface component 149. Application 142 may correspond to executable processes, procedures, and/or applications with associated hardware. In other embodiments, mobile device 140 may include additional or different modules having specialized hardware and/or software as required.

Application 142 may correspond to one or more processes to execute software modules and associated components of mobile device 140 to provide features, services, and other operations for a user over network 160, which may include accessing and utilizing computing services provided by transaction processor 130. In this regard, application 142 may correspond to specialized software utilized by a user of mobile device 140 that may be used to access a website or application (e.g., mobile application, rich Internet application, or resident software application) that may display one or more user interfaces that allow for interaction with the computing services of transaction processor 130. In various embodiments, application 142 may correspond to a general browser application configured to retrieve, present, and communicate information over the Internet (e.g., utilize resources on the World Wide Web) or a private network. For example, application 142 may provide a web browser, which may send and receive information over network 160, including retrieving website information, presenting the website information to the user, and/or communicating information to the website. In this regard, application 142 may be activated, opened, and/or executed in response to a message from payment terminal device 110, which may cause loading of an accessibility user interface (UI) 144 based on embedded or encoded data, such as a webpage address with a corresponding message protocol to prompt for navigation to or automatically navigate to accessibility UI 144. However, in other embodiments, application 142 may instead correspond to a dedicated or mobile software application of transaction processor 130, a merchant, or another entity, which may allow for opening and/or navigating to webpages, interfaces, and the like to display and output accessibility UI 144 based on data for an application interface.

Application 142 may be associated with account information, user financial information, and/or transaction histories. However, in further embodiments, different services may also be provided via application 142, including social networking, media posting or sharing, microblogging, data browsing and searching, online shopping, and other services available through transaction processor 130. Thus, application 142 may also correspond to different service applications and the like. When utilizing application 142 with transaction processor 130, application 142 may request processing of a transaction, such as a payment request with transaction processor 130 via accessibility UI 144. Thereafter, a token or other data may be transmitted wirelessly, such as through short-range wireless communications for contactless or short-range payment protocols, devices, and technology.

In some embodiments, this token may include loyalty information or other applicable user, account, or identification information, which may be tokenized and/or encrypted to prevent being revealed if intercepted (e.g., read in clear or plain text). Such data may allow for direct communications by transaction processor 130 with mobile device 140 to provide and load accessibility UI 144 in application 142 after generation of checkout data 124 and a corresponding website or application interface data for an accessibility-enabled output of checkout data 124 during checkout and processing of a transaction. However, in other embodiments, the payment information does not include such data and the data for accessibility UI 144 may be sent to mobile device 140 for population in application 142 from payment terminal device 110. Application 142 may be used to view the results of transaction processing and the like via one or more interfaces, such as accessibility UI 144 in response to receiving a broadcast of the correspond message for the digital receipt by payment terminal device 110.

In some embodiments, accessibility UI 144 may be provided with accessibility-enabled features already available, enabled, and/or used for an output of checkout data 124 in accessibility UI 144. For example, transaction processor 130 may generate the webpage and/or application data for accessibility UI 144 based on the accessibility options or features. However, in other embodiments, application 142 may enable accessibility options and features based on application capabilities, processes, and features, such as text-to-speech, haptic outputs, visual appearance modifications of text or images, language conversions and translations, and the like. In this regard, accessibility UI 144 may provide options for different accessibility outputs of checkout data 124 based on application and/or device capabilities and may provide those options. In some embodiments, an option may be preselected, default, or preferred for an automatic selection and/or output of checkout data 124 via accessibility UI 144.

In various embodiments, mobile device 140 includes other applications as may be desired in particular embodiments to provide features to mobile device 140. For example, the other applications may include security applications for implementing client-side security features, programmatic client applications for interfacing with appropriate application programming interfaces (APIs) over network 160, or other types of applications. The other applications may also include email, texting, voice and IM applications that allow a user to send and receive emails, calls, texts, and other notifications through network 160. In various embodiments, the other applications may include financial applications, such as banking applications. Other applications may include social networking applications, media viewing, and/or merchant applications.

The other applications may also include location detection applications, which may be used to determine a location for the user, such as a mapping, compass, and/or GPS application, which can include a specialized GPS receiver that determines location information for mobile device 140. The other applications may include device interface applications and other display modules that may receive input from the user and/or output information to the user. For example, the other applications may contain software programs, executable by a processor, including a graphical user interface (GUI) configured to provide an interface to the user. The other applications may therefore use components of mobile device 140, such as display devices capable of displaying information to users and other output devices, including speakers.

Mobile device 140 may further include or be associated with database 146, which may store various applications and data and be utilized during execution of various modules of mobile device 140. Database 146 may correspond to different types of data storage and components including cloud computing storage nodes, remote data stores and database systems, distributed database systems over network 160, and the like used to store various applications and data. Database 146 may include, for example, identifiers such as operating system registry entries, cookies associated with application 142 and/or other applications, identifiers associated with hardware of mobile device 140, or other appropriate identifiers, such as identifiers used for user/device authentication or identification, which may be communicated as identifying the user/mobile device 140 to transaction processor 130.

Mobile device 140 includes at least one short-range transceiver 148 adapted to communicate with payment terminal device 110 and/or other nearby devices, transceivers, and/or components through short-range wireless signaling and communications including NFC communications, RFID communications, Bluetooth, WiFi, infrared scanners and/or communicators, and the like. In various embodiments, short-range transceiver 148 may correspond to microwave, RF, infrared, Bluetooth, and NFC devices and components.

Mobile device 140 includes at least one network interface component 149 adapted to communicate with transaction processor 130 and/or other devices and servers over network 160. In various embodiments, network interface component 149 may include a WiFi component, a DSL (e.g., Digital Subscriber Line) modem, a PSTN (Public Switched Telephone Network) modem, an Ethernet device, a broadband device, a satellite device and/or various other types of wired and/or wireless network communication devices.

POS device 150 may be implemented as a communication device that may utilize appropriate hardware and software configured for wired and/or wireless communication with payment terminal device 110, transaction processor 130, mobile device 140, and/or other devices and servers including merchant purchasing, fulfillment, and/or checkout systems and components. For example, in one embodiment, POS device 150 may be implemented as a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data. Although only one device is shown, a plurality of devices may function similarly and/or be connected to provide the functionalities described herein.

POS device 150 may include one or more applications and/or to provide sales and transaction processing features, services, and other operations by a merchant for consumers, which may include merchant sales operations, POS device processing and/or operations, online merchant marketplaces, sales and inventory services, and the like. POS device 150 may engage with transaction processor 130 for use of a merchant account, payment and/or electronic transaction processing services, and other computing services provided. In some embodiments, this may further include processes for merchant sales, inventory, return or exchange, risk analysis, and other services a merchant may require during the course of their business and sales. In this regard, POS device 150 may correspond to specialized software utilized by a merchant or other user of POS device 150 that may provide applications and application data based on the account and/or computing services provided by transaction processor 130. POS device 150 may provide and/or process items for sale with payment terminal device 110, mobile device 140, and/or a user interacting with POS device 150 (e.g., using a POS device, the website, mobile application, or another merchant marketplace platform). In certain examples, POS device 150 may be accessible over the Internet and provide for sales with POS device 150 over network 160.

In some embodiments, POS device 150 may correspond to and/or be used to configure a checkout application at a physical merchant location, such as the application(s) of a point-of-sale (POS) device used to provide sales at physical locations. For example, POS device 150 may be used to establish a transaction once a user/employee associated with POS device 150 has selected one or more items for purchase and/or entered the item(s) to the transaction for processing. Once a payment amount is determined for the item(s) to be purchased by the user, POS device 150 may request payment for the transaction. Payment may be provided using electronic transaction processing services enabled and/or provided by transaction processor 130 via payment terminal device 110, as discussed herein. In this regard, payment may be received from a user and may be processed using payment terminal device 110 and/or transaction processor 130, and POS device 150 may interact with payment terminal device 110 for payment processing and/or reading, receiving, and/or processing data. As such, payment terminal device 110 and POS device 150 may interact when performing the short-range wireless communication discussed herein to provide data to mobile device 140 without requiring and/or requesting identification information, contact identifiers, and the like. After receipt of payment and/or confirmation of the payment, POS device 150 may then process a payment to the merchant associated with POS device 150.

Although payment terminal device 110 and POS device 150 are shown as separate devices interacting, such as a payment terminal and/or card reader with a merchant POS device, it is understood that payment terminal device 110 and POS device 150 may be the same device and/or system or one or more components or operations of payment terminal device 110 and POS device 150 may be provided by the same device or system.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
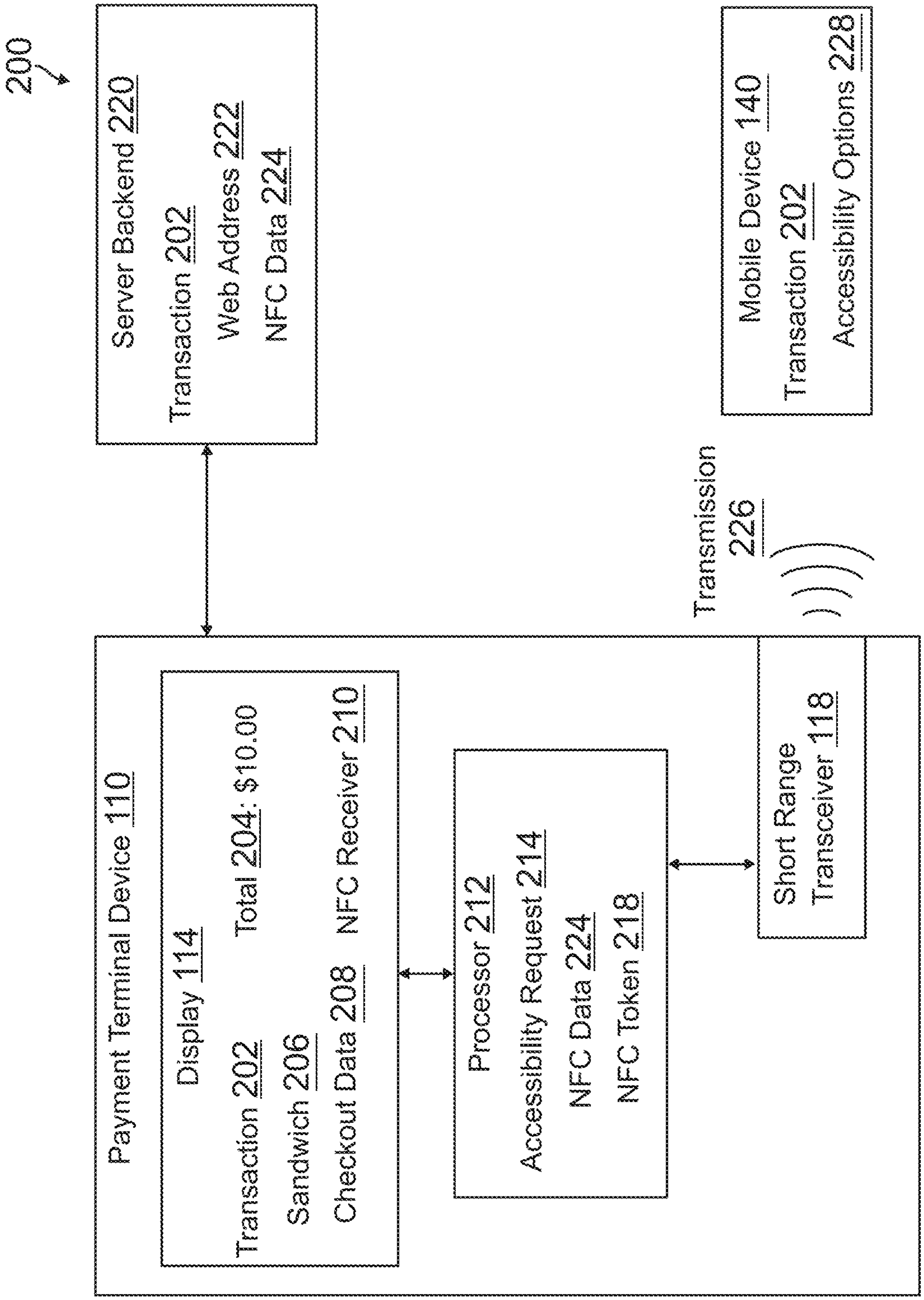
FIG. 2 is an exemplary system environment where a mobile device interacts with a payment terminal device or system to facilitate accessibility options on the mobile device using short-range wireless communications, according to an embodiment.

FIG. 2 is an exemplary system environment 200 where a mobile device interacts with a payment terminal device or system to facilitate accessibility options on the mobile device using short-range wireless communications, according to an embodiment. System environment 200 of FIG. 2 includes payment terminal device 110 interacting with mobile device 140, discussed in reference to system 100 of FIG. 1, to facilitate transmission of data wirelessly and without requiring mobile device 140 and/or a corresponding user to enter an identifier or other user information. The data may be used for accessibility options provided on mobile device 140, which may allow presentation of checkout data for a transaction with accessibility features or output. In this regard, a server backend 220 (e.g., one or more servers and/or backend processors of transaction processor 130 discussed in reference to system 100) may provide webpage or interface data for checkout data and accessibility output.

In system environment 200 of FIG. 2, different interactions, data, and components are shown in order to generate and transmit data that can be output based on accessibility options and features wirelessly to mobile device 140 from payment terminal device 110 over a short-range wireless communication channel/connection, or over a network to an address or account, without requiring a contact identifier or other user contact information to be directly input to payment terminal device 110. Initially, payment terminal device 110 may be used to create, generate, and/or input a transaction, which may correspond to a user utilizing mobile device 140. The transaction may be for purchase of items and/or services from a merchant and the merchant or an employee of the merchant may be utilizing payment terminal device 110 to finalize and process the transaction. As such, display 114 may present information for a transaction 202 having a transaction total 204 for an item 206, such as a sandwich or another good, product, service, or the like from a merchant. Item 206 may have been scanned (e.g., based on a barcode, packaging, etc.) or entered/selected for purchase, and transaction total 204 may then be generated. Thereafter, the user and/or mobile device 140 may provide a payment instrument to pay for and process transaction 202.

Checkout data 208 may be provided on display 114, where the merchant or the user may select an option to wirelessly provide checkout data 208 to POS device 150 for output based on accessibility options. For example, data for an accessibility request 214 may be generated from a short-range wireless interaction between payment terminal device 110 and mobile device 140, such as a "tap to receive" option that does not require the user to enter their contact information and/or identifiers for data exchange. The process to exchange the data may be requested via a selectable option for NFC receiver 210, which allows for checkout data 208 and a corresponding NFC message or other communication to be generated and exchanged with mobile device 140. For example, communications between payment terminal device 110 and mobile device 140 may be performed via short-range wireless communications, which may be done by placing a corresponding device and/or transceiver (e.g., mobile device 140) within a wireless proximity range to payment terminal device 110 and short-range transceiver 118. This allows for NFC or other short-range wireless communications to exchange data, which may be used for payments, as well as to exchange data for presentation of checkout data 208 on mobile device 140 with accessibility-enabled options, features, and output. For example, NFC data exchange format (NDEF) may be utilized, which may correspond to a standardized data format specification used for NFC data transmissions. NDEF may be used to encode actions to NFC tags and/or exchange data between devices, which allow generating, transmitting, and/or reading NDEF messages by and between devices.

A processor 212 of payment terminal device 110 may generate accessibility request 214 for transaction 202, which may correspond to checkout data 208 that includes conveyable data (e.g., via audio, visual, haptic, etc. output) for transaction, item, cost, or other information. Accessibility request 214 may be processed with server backend 220 to generate a web address 222 that allows for retrieval of checkout data 208 by mobile device 140 and output based on accessibility options. Processor 212 may correspond to a hardware and/or software processor that may be configured to process data for transaction 202 and accessibility request 214, such as using operations of payment processing application 120. An XML, HTML, or other data file may be loaded in a browser application, such as by navigation to a corresponding webpage using a webpage address. However, other applications and identifiers for online data retrieval may also be used, such as application interface data for a specific mobile software application of a merchant, transaction processor, or other service provider. Accessibility request 214 may be associated with NFC data 224 once web address 222 is generated for the webpage or application data, which may allow transmission of web address 222 and/or other message data to mobile device 140, such as via an NFC token 218 or other NFC message. Processor 212 may request and/or generate NFC token 218 for NFC data 224 to transmit accessibility request 214 by embedding, adding, or otherwise providing web address 222 in the message structure or content, such as in a message field, for updating of a webpage and/or in an application interface. In some embodiments, NFC token 218 may cause accessibility request 214 to load from a webpage or in an application in a corresponding application on mobile device 140.

Accessibility request 214 may correspond to data, identifiers, addresses, and the like for checkout data 208, which may be stored by processor 212 and provided to server backend 220. Server backend 220 may correspond to a server and data storage system that may generate web address 222 for transaction 202 based on accessibility request 214, which may include changes from accessibility request 214 for updates 216. Server backend 220 may process transaction 202 to provide a payment, which may then initiate accessibility request 214 and generation of web address 222 for accessibility request 214. As such, server backend 220 may further correspond to an online transaction processor or other payment service that may electronically process transaction 202 and store accessibility request 214 for transaction 202. Web address 222 may be generated as a webpage with corresponding webpage data in one or more webpage interfaces, fields, elements, menus, or the like for checkout data 208, which may be updated in real-time as transaction 202 is processed and completed. Web address 222 may also or instead correspond to application data, such as data presentable via one or more application interfaces, As such, web address 222 may be presented on mobile device 140 to view checkout data 208 with accessibility options enabled or provided for more accessible output of the information, and may be updated, changed, refreshed, reloaded, or the like based on changes to transaction 202 during processing and completion.

To provide notification to mobile device 140, a link to a webpage, network resource, and/or address that may load web address 222 (e.g., a URL for a webpage or a URI/file path to online data for a webpage or application data) may be generated by server backend 220. NFC data 224 may be generated from this link, which may correspond to the link in a format for NFC embedding (e.g., NDEF or the like). NFC data 224 may be added, inserted, or used to generate a message, such as NFC token 218, which may be transmitted to mobile device 140. Transmission may occur via payment terminal device 110, such as via short-range transceiver 118 through transmission 226. Transmission 226 may correspond to a direct data transmission or communication, as well as broadcasts of data that may not be device specific. Further, transmission 226 may cause NFC token 218 to be received by mobile device 140, which prompts mobile device 140 and/or the corresponding user to open or process NFC token 218, navigate to a webpage or application data using the link or other data in the message, and load web address 222 on mobile device 140. As such, checkout data 208 with accessibility options 228 may be output, which may allow for viewing of checkout data 208 in a more accessible manner for users that may have disabilities, impairments, or the like. Further, such opening, navigating, and loading may be performed automatically on receipt of NFC token 218 from transmission 226 by mobile device 140.

If transmission 226 fails, display 114 may further be used to display and output a code, such as a barcode or QR code, having encoded data that includes web address 222 and/or NFC data 224, the link to the data, or other data for loading and providing checkout data 208 on mobile device 140. Such output may be responsive to a failure to transmit transmission 226, a failure of mobile device 140 to detect transmission 226 and/or a command input on payment terminal device 110 (e.g., a request to end transmission 226 and display the QR code, such as if there is an error or inability to exchange data). Additionally, in other embodiments, mobile device 140, during processing of transaction 202, may wirelessly transmit data to payment terminal device 110, including loyalty data or other identifiers, identification information, and/or account information, which may be encrypted, hashed, tokenized, or otherwise obscured so that a contact identifier, PII, or other identifying information is not exchange in clear or plain text. This may be done via short-range wireless communications, such as an NFC tap, and may be based on a digital wallet and digital wallet data and preferences. As such, server backend 220 may receive such loyalty or other data when processing transaction 202 and use the data to directly push or provide web address 222 over a network connection (e.g. Internet or cellular network connection) to mobile device 140 without requiring routing through payment terminal device 110.

Figure 3A:
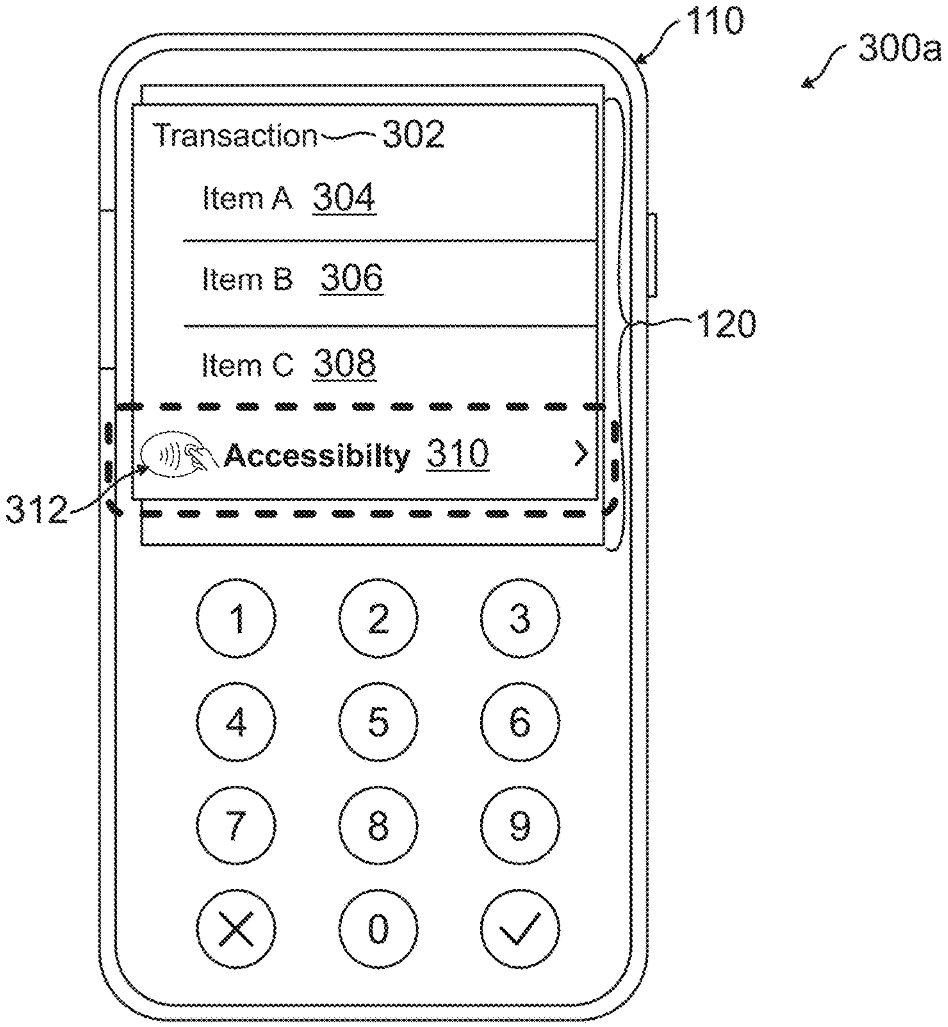
FIGS. 3A-3C are exemplary diagrams of a payment terminal interacting with a mobile device to provide a corresponding user interface for accessibility options, according to an embodiment.
Figure 3B:
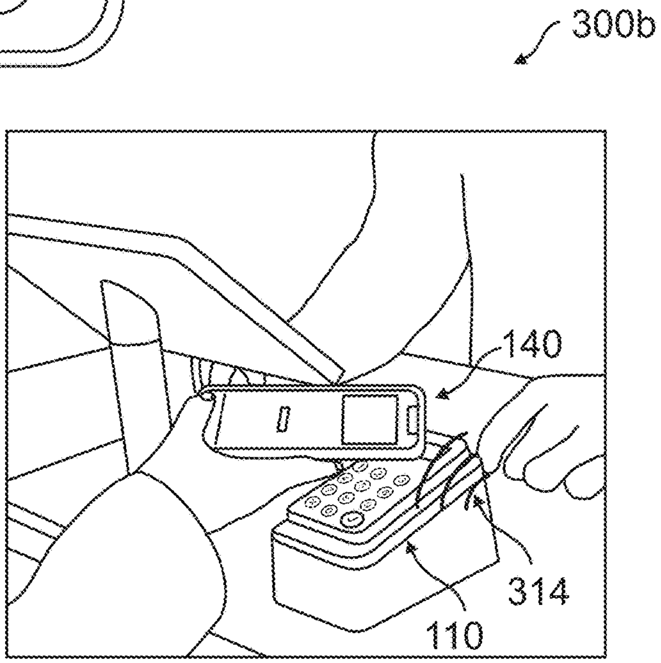
Figure 3C:
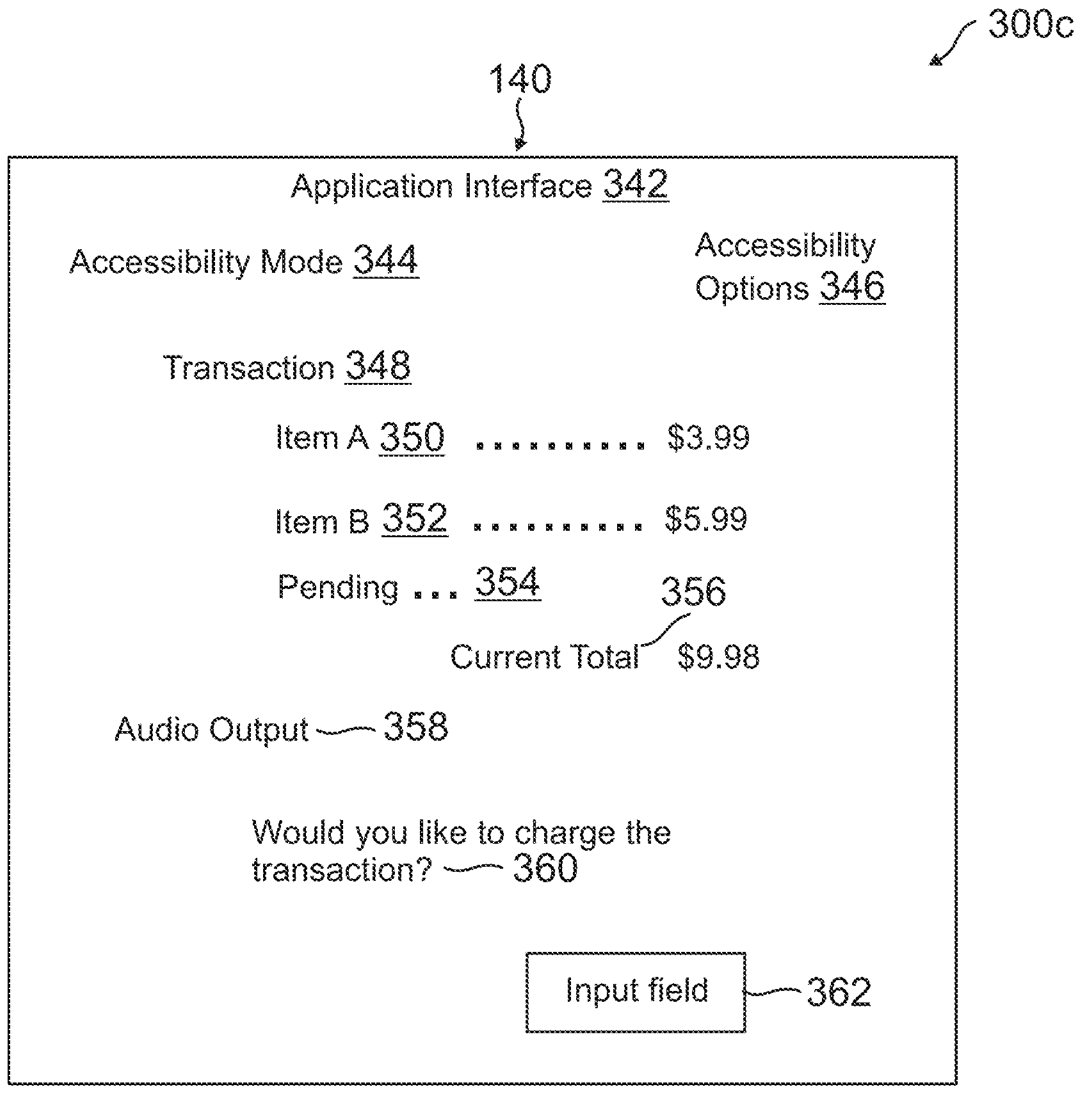

FIGS. 3A-3C are exemplary diagrams 300*a*-300*c* of a payment terminal interacting with a mobile device to provide a corresponding user interface for accessibility options, according to an embodiment. For example, diagrams 300*a*-300*c* include payment terminal device 110 interacting with mobile device 140, discussed in reference to system 100 of FIG. 1, to facilitate transmission of checkout data from payment terminal device 110 to mobile device 140 for accessibility options without requiring a contact identifier or other user information. In this regard, different user interfaces and user interactions to facilitate this data exchange and use of accessibility options in user interfaces are shown in diagrams 300*a*-300*c*.

In diagram 300*a*, payment terminal device 110 is shown displaying a transaction 302 being generated and/or processed in payment processing application 120 of payment terminal device 110 when items or services are added for payment. In this regard, payment terminal device may provide an option to receive checkout data for transaction 302 for use with accessibility options, effectively converting mobile device 140 to an accessibility device for checkout and transaction processing that may assist users with disabilities, impairments, issues, including ones are due at least in part to the merchant location, or the like. For example, payment terminal device 110 may correspond to a card reader that may allow a user to enter or provide a payment instrument for payment processing with a corresponding transaction with a user. In some embodiments, payment terminal device 110 may correspond to a PAYPAL ZETTLE® payment terminal or device. As items for a transaction are added, such as items 304, 306, and 308, payment processing application 120 may display an interface that requests whether the user would like the checkout data for transaction 302 be provided on the user's device, such as for use with accessibility options. A merchant or the user may then select an option in transaction 302 to provide the checkout data to the user through one or more communication channels, where entry may be made through an input component (e.g., keypad or keyboard, touch screen, etc.).

Transaction 302 in diagram 300*a* displays a "tap-to-accessibility" or an accessibility option 310 that allows the user to receive the checkout data with accessibility options on their mobile device after performing a "tap" or placing their device within a short-range proximity while an NFC, RFID, or other signal is being broadcast for a data exchange that facilitates loading of data on mobile device 140 from a webpage or application data source (e.g., from a URI, file path, or other locator for online data). Accessibility option 310 further includes an instruction icon 312 designating that the data is to be transmitted via NFC or other short-range wireless communications, and therefore a user should tap, or otherwise place, their corresponding device within a short proximity range to payment terminal device 110 to allow for data transmission and detection of a broadcast of the checkout data for use with accessibility options, such as to read out or provide an acceptable visual representation (e.g., size, color, language, etc.) of item A 304, item B 306, and/or item C 308 as the items are added to transaction 302 and/or processed and paid for in the transaction. This may allow a user to add, remove, or inquire about each item as added and processed. For example, the user may request, via human interaction or their device displaying the checkout data for transaction 302, more information for item B 306 or that item C 308 be removed from the transaction.

In this regard, conventional data transfers of the checkout data require a user to provide a contact identifier, such as an email address or phone number respectively, that would compromise the user's anonymity and allow the merchant or others to perform unwanted outreach and communications (e.g., advertisement, spam, customer surveys, etc.). As such, accessibility option 310 allows the user to digitally receive checkout data on the user's device, such as a mobile or wearable device, without providing information that would allow the merchant or another entity to contact the user and provide unwanted communications. As such, accessibility option 310 provides an enhanced level of digital privacy and security to user's online identities and contact addresses or identifiers.

In diagram 300*b*, accessibility option 310 from diagram 300*a* has been selected and instruction icon 312 has informed the user to bring their computing device, shown as mobile device 140 or a mobile phone (although a wearable device, tablet, or other portable or moveable computing device may also be used), into a proximity range for short-range wireless communications (e.g., using NFC or similar protocols). A message on payment terminal device 110 may be encoded with, have embedded data for, or otherwise contain information for the checkout data, NFC message and/or token, or the like, such as an NFC formatted message with a URL, URI, file path, or the like for a webpage or application data for loading. For example, the checkout data for a transaction to be displayed with accessibility options may be generated as a data file or object, which may be loaded via a webpage or user interface having a corresponding webpage address or other link, which may allow storing, hosting, and providing the webpage or user interface to an application for display and output. Such address may be added or embedded to a message field, where the message field includes or causes an executable process on mobile device 140 to load or prompt the user to load the webpage address and navigate to the webpage in a browser application on mobile device 140.

In this regard, a webpage or application data for checkout data may be generated in HTML and provided over a network as a webpage, may be encoded in an XML file and stored where the HTML encoded webpage may serve as an online backup, may be encoded or provided in a file or message type and sent directly, or may be encoded or provided in a larger file size, such as a Portable Network Graphics (PNG) image type file or the like. In this regard, data size constraints of the file and communication channel (e.g., NFC alone or with network communications using links and locators) may be used to select a file type and/or transmission process. Further, the user may select an option to receive and accept the message, file, and/or notification, which may be used to select the file type and/or transmission process.

Thereafter, the message may be transmitted through short-range wireless communications, where the message may be transmitted through broadcast 314. Broadcast 314 may correspond to a short-range transmission by a component on payment terminal device 110 that occurs continuously or periodically over a time period and allows for conveyance of the message to mobile device 140. In this regard, mobile device 140 may detect broadcast 314, which may cause the webpage and/or application data to load on mobile device 140 when received via broadcast 314 or after providing loyalty data or other user/account information back to payment terminal device 110. If broadcast 314 is not detected, payment terminal device 110 may repeat or continue transmission of broadcast 314 based on one or more commands or may instead move to display a barcode or QR code having encoded data for the checkout data and/or accessibility options. Such transmission mechanisms may therefore not require the user to enter a contact identifier.

In diagram 300*c*, an exemplary application interface 342 on mobile device 140 is shown, which may be displayed by application 142. Application interface 342 may correspond to an accessibility interface or other user interface of a mobile software application, however, other devices and/or applications may also be used to provide accessibility options with exchanged and transferred data as discussed herein. In this regard, application interface 342 may be used to provide checkout data during electronic transaction processing at merchant devices based on data exchanged via an NFC tap.

For example, after an NFC tap is performed as described above with regard to diagrams 300*a* and 300*b*, a webpage or application interface data may be retrieved and presented in application interface 342 based on a checkout of a transaction. Application interface 342 may then enter an accessibility mode 344 or other display data in accessibility mode 344 based on accessibility options 346. Accessibility mode 344 may correspond to one or more of accessibility options 346 that are selected and utilized to convey data to a user in a manner in which the user can consume, including based on providing data in formats or manners that may assist consumption and understanding by an impaired or disabled person. This may include different visual outputs, audio outputs, haptic outputs, and the like, which may be provided for sight, sound, touch, etc.

Accessibility mode 344 may display a transaction 348, which may include an item A 350 and an item B 352. Pending items 354 may be shown as new items added to transaction 348, and application interface 342 is updated in real-time based on new incoming data. As such, a current total 356 may display the current cost and amount due, but may be updated as more items are added. To assist a user in understanding that item A 350, item B 352, and/or pending items 354 are being added to and/or processed in transaction 348, as well as current total 356, an audio output 358 may be provided as an accessibility feature and output. A visual payment option 360 may also be provided as an accessibility feature that allows a user to proceed through an easier payment process that may be done on device instead of with a merchant device or payment terminal. An input field 362 may further be used to allow the user to change the transaction on the device. As such, these accessibility options may assist the user when reviewing and paying for transaction 348 on mobile device 140.

Figure 4:
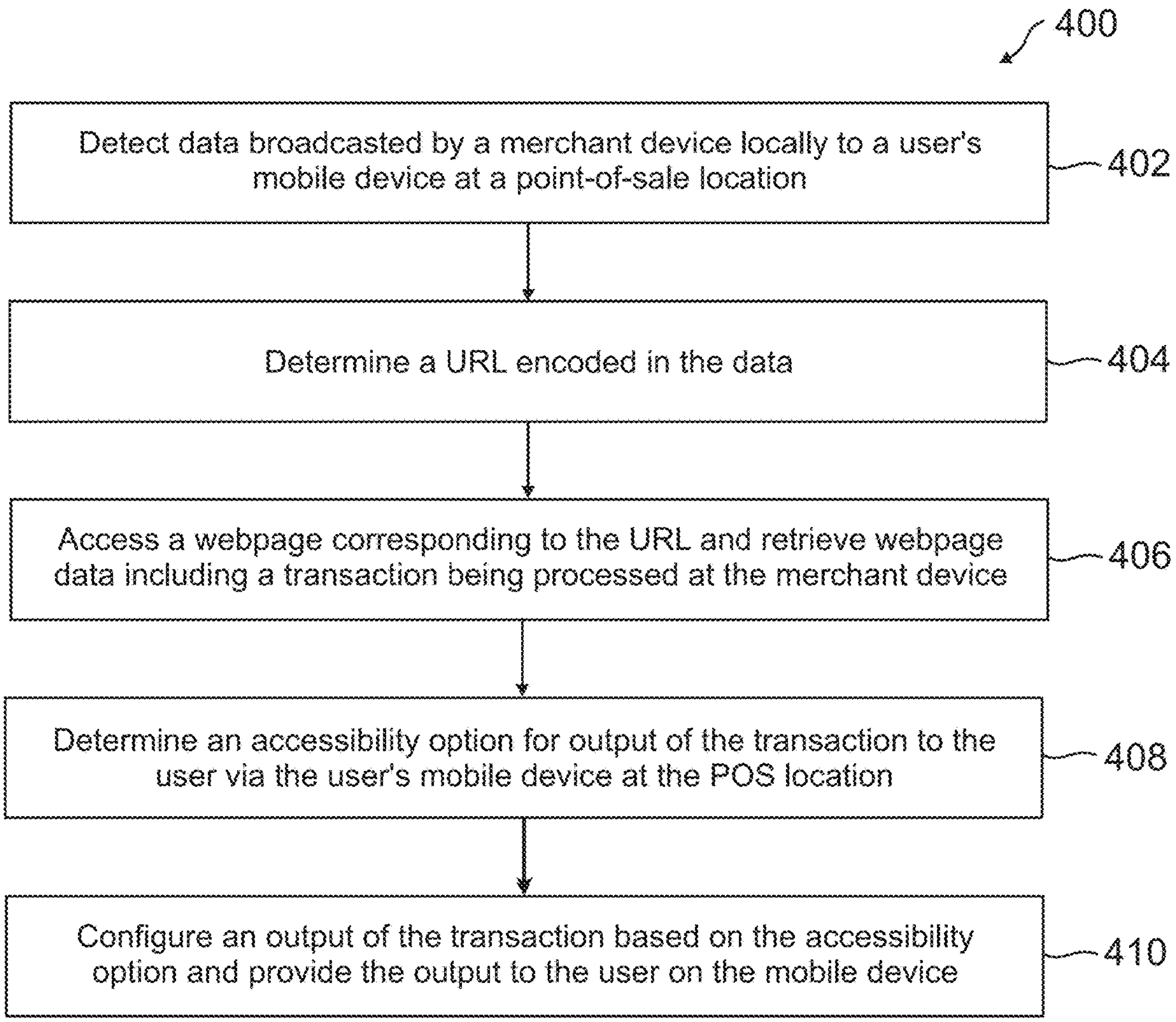
FIG. 4 is a flowchart of an exemplary process for on-device accessibility options for checkout data using short-range wireless transmissions, according to an embodiment.

FIG. 4 is a flowchart of an exemplary process for on-device accessibility options for checkout data using short-range wireless transmissions, according to an embodiment. Note that one or more steps, processes, and methods described herein of flowchart 400 may be omitted, performed in a different sequence, or combined as desired or appropriate.

Flowchart 400 in FIG. 4 includes steps executed by transaction processor 130 with payment terminal device 110 and mobile device 140, such as when providing data to mobile device 140 for accessibility interfaces, outputs, and features. As such, different portions of the steps of flowchart 400 are shown as being performed by, on, or with payment terminal device 110, transaction processor 130, mobile device 140, and/or POS device 150.

At step 402 of flowchart 400, data broadcasted by a merchant device locally to a user's mobile device at a point-of-sale location is detected. For example, payment terminal device 110 in system 100 of FIG. 1 may receive transaction data, such as from user input, data scans, and/or communications, and process the transaction with transaction processor 130. In some embodiments, mobile device 140 may also provide and/or process the transaction data, such as by providing a digital token or payment information for payment processing. Such interactions may also be shown by payment terminal device 110, mobile device 140, and server backend 220 in system environment 200 of FIG. 2. A user may enter into a transaction at a physical merchant location, such as a merchant storefront or retail location. There, the user may initiate and process a transaction with a corresponding merchant device including POS devices, merchant payment terminals, self or automated checkout registers, and other merchant checkout and payment devices. The user may pay for one or more items or services and may then provide a payment instrument for transaction processing and completion.

However, during this process, a user may wish to view, hear, or otherwise consume media and/or content for the transaction, such as a visual output in a user interface, an audio text-to-speech, or the like. The user may request this output due to a disability, impairment, issues associated with the location, or the like. As such, payment terminal device 110 and/or transaction processor 130 may generate checkout data and a message that may provide the checkout data on mobile device 140 using a webpage or application interface data. Payment terminal device 110 may not require the user to enter a contact identifier, such as a name, phone number, email address, or the like. This may further ensure and protect the privacy of the user and limit or minimize spam and other unwanted communications by the merchant or another entity that may receive and/or access the user's preferred contact identifier.

Once the message is generated, payment terminal device 110 may broadcast, or otherwise transmit in a directed or undirected manner, a message (e.g., NFC tap message) for the device application data to mobile device 140. Broadcasting may be performed for a set period of time over the short-range wireless communications using a corresponding short-range wireless protocol. In this regard, a wireless transceiver of the payment terminal, POS device, or other merchant device may begin to transmit the message, such as continuously or periodically, for a time period with an instruction for the user to place their mobile, wearable, or other device within a proximity to merchant's device. The option to extend or rebroadcast may also be provided on the merchant's device at or near the end of the broadcast. If transmission and receipt of the message and corresponding digital receipt is not performed or does not occur, such as if the mobile device cannot or does not receive the message, another option to transmit the message and/or digital receipt may occur. For example, payment terminal device 110 may display a barcode or QR code that includes encoded data for the webpage and/or application interface.

At step 404, a URL encoded in the data is determined. A webpage and/or data file for the checkout data and/or accessibility options maybe generated to include information from the transaction and a field that may be updated and/or is dynamic to track data that for the order from the merchant's ordering and/or fulfillment system. In this regard, a webpage may be generated as an XML or HTML file, which may be accessible and loaded when navigating to a webpage address. Other data containers, files, and online addresses may also be utilized for checkout data and/or accessibility option transmission to mobile devices. For example, application interface data may be generated that may be populated in an application of the merchant and/or transaction processor, as well as pushed to the mobile device of the user. As such, the device application data may correspond to data that may be displayed in an application on the user's mobile device, and those other identifiers including URIs, file paths, and the like to application data may instead be used and encoded/embedded in the message and/or data transmitted and detected at step 402. As such, a data file and link, address, or identifier may be generated that allows for providing checkout data with accessibility options directly on a user's mobile device.

An address or link and file may enable transmitting, providing, and/or loading the checkout data on a computing device, such as a mobile device of a user. For example, a webpage address or link to a webpage with a webpage file (e.g., HTML or XML) may be created, however other files and formats also be used. The data may be hosted via a webpage and/or stored in an online storage, such as a cloud-based or other large data storages that may store data with corresponding identifiers allowing for data retrieval. A message may also be generated for transmission using a short-range wireless protocol and messaging format, such as NDEF or the like. The message may be generated by adding, embedding, or otherwise providing the address, link, or other identifier for retrieval of the notification via the webpage or application data. For example, a message protocol for short-range wireless communications may allow the webpage address, a link, and/or executable command or operation to be embedded, added, or included in a field. The field may correspond to a header, message body, or the like, and may cause the message to open an application and load the digital receipt or navigate to the webpage and/or application interface data. As such, when the message is received, the webpage address, such as the URL, URI, file path, or the like, may be determined by the receiving mobile device.

At step 406, a webpage corresponding to the URL is accessed and webpage data including a transaction being processed at the merchant device is retrieved. A web browser or other software application on the user's mobile device may request permission to navigate to, or may automatically navigate to when the message is received and the URL or other identifier determined, the corresponding webpage or other data at the resource's network address. This may include determining and loading a webpage and/or user interface data for a user interface in an application. The data that may be presented on the webpage or via the application interface may correspond to checkout data, which may be presented with accessibility options and/or features.

At step 408, an accessibility option for output of the transaction to the user via the user's mobile device at the POS location is determined. Accessibility options may correspond to selectable and/or configurable options for providing access to information in a manner that assists a user with a disability, impairment, or other issues associated at the location that may have make it more difficult for the user to consume conventional or standard viewing or receipt of the information. For example, accessibility options may allow a user to change how, when, and through what devices or communication channels and/or mediums information is conveyed to a user. As such, the accessibility options may change the appearance (e.g., larger font, bolded font, a specific font style), sound (e.g., loudness level, tone), or the like (e.g., vibrational Morse code) of information when conveyed to the user, and may be done through the features, components, and applications of the user's mobile device. As such, the accessibility options may be determined based on user preferences and/or selections/requests, device capabilities, application functionalities, and the like.

These accessibility options may be offered to the user to select from with the checkout data for the transaction, or one or more accessibility options may be preselected or automatically selected based on the device, environment, data, user, and the like. At step 410, an output of the transaction is configured based on the accessibility option and the output is provided to the user on the mobile device. As such, based on the selected accessibility option(s), the transaction's checkout data provided to the user's mobile device may be changed, altered, or otherwise modified so that the transaction and its corresponding information may be conveyed to the user in the manner in which the accessibility option(s) require. This allows the user to view, hear, or otherwise consume content for the transaction that is specifically configured to their disability or impairment, and therefore may provide enhanced accessibility to the information in a convenient, secure, and privacy-protected manner.

Figure 5:
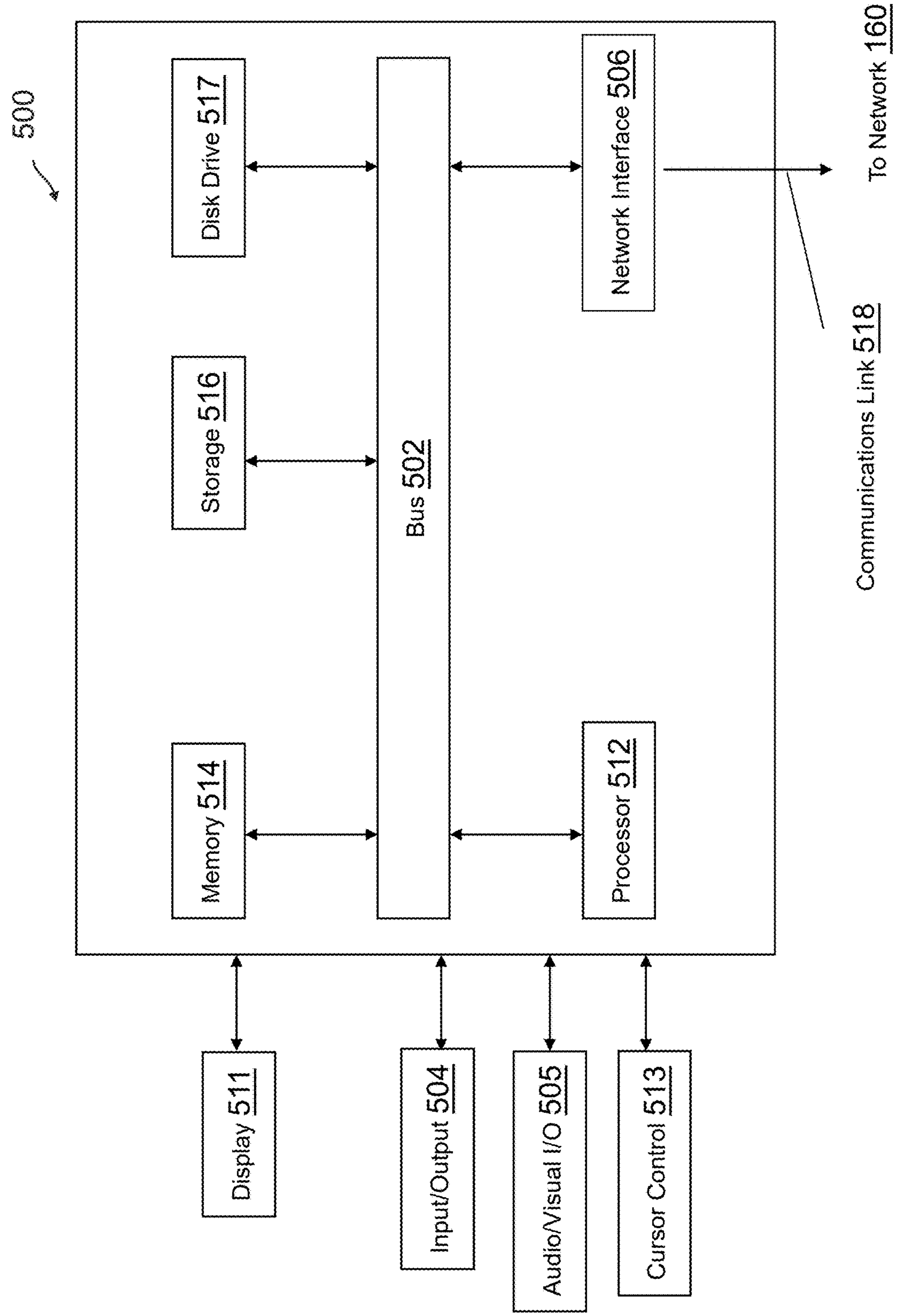
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows. For example, payment terminal device 110, transaction processor 130, mobile device 140, POS device 150, and/or one or more of the servers, devices, or other components in system 100 of FIG. 1 may be implemented by computer system 500.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A user device system comprising:

a non-transitory memory; and one or more hardware processors coupled to the non-transitory memory and configured to execute instructions to cause the user device system to:

detect broadcasted data transmitted by a merchant device over short-range wireless communications;

determine a web address based on the broadcasted data;

access a webpage corresponding to the web address, wherein the webpage is dynamically generated for checkout data for a transaction being processed at the merchant device and provides an output of the checkout data via an accessibility option;

retrieve the checkout data for the transaction based on the webpage, wherein the checkout data is retrieved without requiring the user to provide a contact identifier to the merchant device, and wherein the checkout data comprises dynamic data for the transaction that is capable of being updated in real-time as the transaction is processed at the merchant device;

determine, based on an accessibility preference stored on the user device system and associated with the user utilizing the user device system, the accessibility option associated with the output of the checkout data in an application via an output component of the user device system, wherein the accessibility option aids the user with consuming the checkout data while utilizing the user device system;

configure the checkout data based on the accessibility option;

output the configured checkout data via the application;

receive one or more updates to the dynamic data while the transaction is being processed at the merchant device; and update the output of the configured checkout data in real-time based on the one or more updates to the dynamic data and the accessibility option.

2. The user device system of claim 1, wherein the broadcasted data comprises a digital near field communications (NFC) token, and wherein the web address comprises one of a network file path or a uniform resource locator (URL).

3. The user device system of claim 1, wherein the web address enables the application to be directed to the webpage having the checkout data hosted by a transaction processor for the transaction on behalf of the merchant device, and wherein the webpage is output via the application based on the accessibility option.

4. The user device system of claim 1, wherein executing the instructions further causes the user device system to:

determine, prior to determining the web address, that the broadcasted data detected over the short-range wireless communications cannot be used to determine the web address;

capture a quick response (QR) code that includes encoded data for the broadcasted data; and decode the broadcasted data from the encoded data of the QR code.

5. The user device system of claim 1, wherein the broadcasted data comprises an electronic message transmitted using a near field communication (NFC) standard that provides the web address with an executable command without a message file attachment, and wherein retrieving the checkout data comprises:

executing the executable command; and fetching the checkout data from the webpage corresponding to the web address based on the executing.

6. The user device system of claim 5, wherein the accessibility option provides an assistance to the user when reviewing the checkout data for the transaction, and wherein the assistance is associated with one of a visual appearance of the checkout data, a text-to-speech output of audio data associated with the checkout data, a voice input or a text input by the user performed in association with the checkout data that is converted to the text-to-speech output, or a payment option preselected by the user on the user device system for the transaction.

7. The user device system of claim 1, wherein executing the instructions further causes the user device system to:

determine that the accessibility option is enabled for the output of the configured checkout data prior to outputting the configured checkout data via the application.

8. The user device system of claim 1, wherein executing the instructions further causes the user device system to:

determine, based on the accessibility option, to process a payment for the transaction at the user device system instead of the merchant device; and process the payment at the user device system.

9. A non-transitory machine-readable medium having stored thereon machine-readable instructions executable to cause a machine to perform operations comprising:

receiving a web address broadcasted by a merchant device over short range wireless communications within a wireless proximity range to the merchant device;

fetching, from a webpage corresponding to the web address, checkout data for a transaction being processed at the merchant device, wherein the checkout data is fetched without requiring the user to provide a contact identifier to the merchant device, wherein the checkout data comprises dynamic data for the transaction that is capable of being updated in real-time as the transaction is processed at the merchant device, wherein the webpage is dynamically generated for the checkout data for the transaction and provides an output of the checkout data via the accessibility option, and wherein the webpage is hosted for the transaction based on a request for the output of the checkout data based on an accessibility option;

determining, based on an accessibility preference stored on a device of the user, the accessibility option requested for the output of the checkout data via an output component, wherein the accessibility option provides an assistance to the user during a review of the checkout data for the transaction;

configuring the checkout data based on the accessibility option;

outputting the configured checkout data via the application;

receiving one or more updates to the dynamic data while the transaction is being processed at the merchant device; and updating the output of the configured checkout data in real-time based on the one or more updates to the dynamic data and the accessibility option.

10. The non-transitory machine-readable medium of claim 9, wherein the web address is broadcasted using a digital near field communications (NFC) token, and wherein the web address comprises one of a network file path or a uniform resource locator (URL) that is embedded in a message field corresponding to the NFC token.

11. The non-transitory machine-readable medium of claim 9, wherein the assistance is associated with one of a visual appearance of the checkout data, a text-to-speech output of audio data associated with the checkout data, a voice input or a text input by the user performed in association with the checkout data that is converted to the text-to-speech output, or a payment option preselected by the user on the user device system for the transaction.

12. The non-transitory machine-readable medium of claim 9, wherein the operations further comprise:

receiving an input that changes the checkout data; and transmitting the input to the merchant device via the webpage.

13. A method comprising:

detecting broadcasted data transmitted by a merchant device to a user device system over short-range wireless communications;

determining a web address based on the broadcasted data;

retrieving checkout data for a transaction being processed at the merchant device based on the web address, wherein the checkout data is retrieved without requiring the user to provide a contact identifier to the merchant device, and wherein the checkout data comprises dynamic data for the transaction that is capable of being updated in real-time as the transaction is processed at the merchant device;

accessing a webpage corresponding to the web address, wherein the webpage is dynamically generated for the checkout data for the transaction and provides an output of the checkout data via the accessibility option;

determining, based on an accessibility preference stored on the user device system and associated with the user utilizing the user device system, an accessibility option associated with the output of the checkout data in an application via an output component of the user device system, wherein the accessibility option aids the user with consuming the checkout data while utilizing the user device system;

configuring the checkout data based on the accessibility option;

outputting the configured checkout data via the application;

receiving one or more updates to the dynamic data while the transaction is being processed at the merchant device; and updating the output of the configured checkout data in real-time based on the one or more updates to the dynamic data and the accessibility option.

14. The method of claim 13, wherein the broadcasted data comprises a digital near field communications (NFC) token, and wherein the web address comprises one of a network file path or a uniform resource locator (URL).

15. The method of claim 13, wherein the web address enables the application to be directed to the webpage having the checkout data hosted by a transaction processor for the transaction on behalf of the merchant device, and wherein the webpage is output via the application based on the accessibility option.

16. The method of claim 13, further comprising:

determining, prior to determining the web address, that the broadcasted data detected over the short-range wireless communications cannot be used to determine the web address;

capturing a quick response (QR) code that includes encoded data for the broadcasted data; and decoding the broadcasted data from the encoded data of the QR code.

17. The method of claim 13, wherein the broadcasted data comprises an electronic message transmitted using a near field communication (NFC) standard that provides the web address with an executable command without a message file attachment, and wherein retrieving the checkout data comprises:

executing the executable command; and fetching the checkout data from the webpage corresponding to the web address based on the executing.

18. The method of claim 17, wherein the accessibility option provides an assistance to the user when reviewing the checkout data for the transaction, and wherein the assistance is associated with one of a visual appearance of the checkout data, a text-to-speech output of audio data associated with the checkout data, a voice input or a text input by the user performed in association with the checkout data that is converted to the text-to-speech output, or a payment option preselected by the user on the user device system for the transaction.

19. The method of claim 13, further comprising:

determining that the accessibility option is enabled for the output of the configured checkout data prior to outputting the configured checkout data via the application.

20. The method of claim 13, further comprising:

determining, based on the accessibility option, to process a payment for the transaction at the user device system instead of the merchant device; and processing the payment at the user device system.

* * * * *